June 6, 1967  B. R. McFADDEN ET AL  3,324,443
PLUGBOARD DEVICE CONSTRUCTION AND METHOD
Filed March 9, 1964  8 Sheets-Sheet 2

INVENTOR.
BRUCE RICHARD McFADDEN
MICHAEL PLAXA
BY Curtis, Morris & Safford

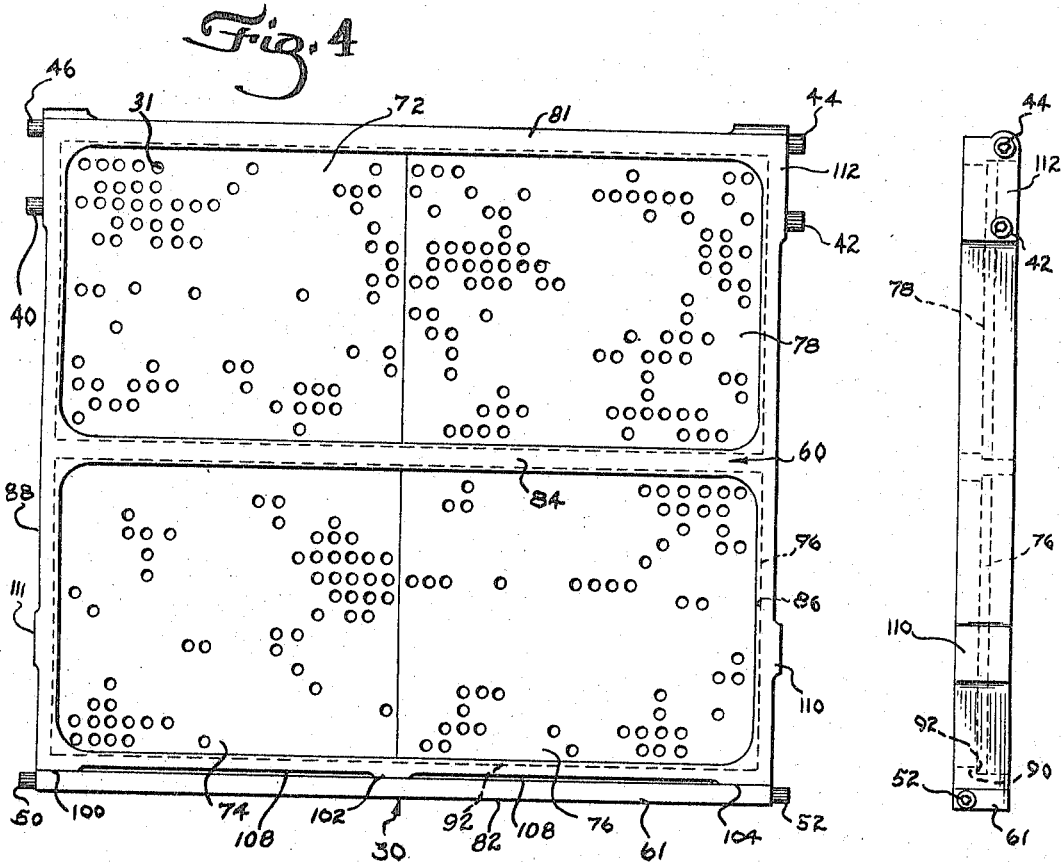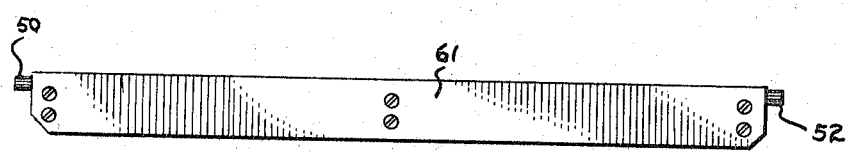

June 6, 1967 B. R. McFADDEN ET AL 3,324,443
PLUGBOARD DEVICE CONSTRUCTION AND METHOD
Filed March 9, 1964 8 Sheets-Sheet 4
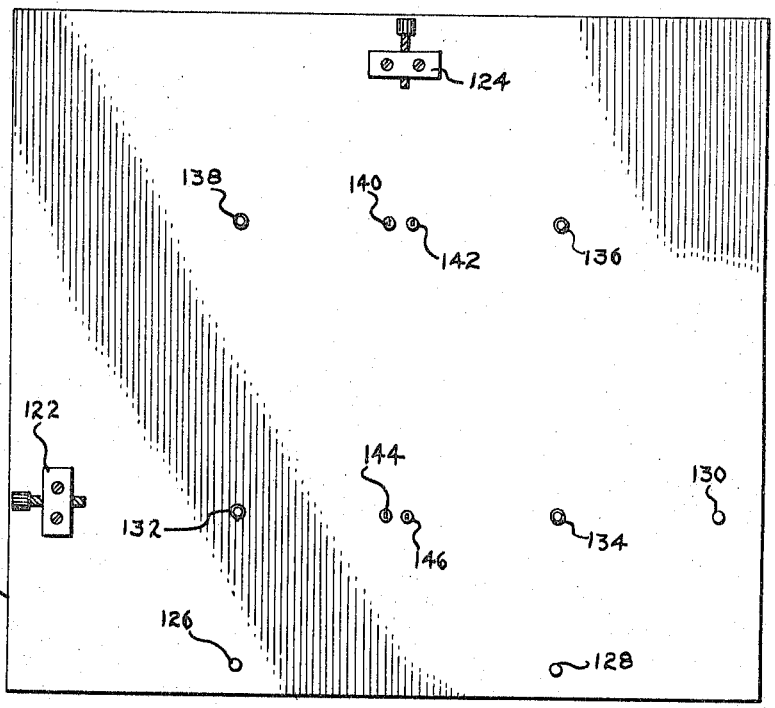
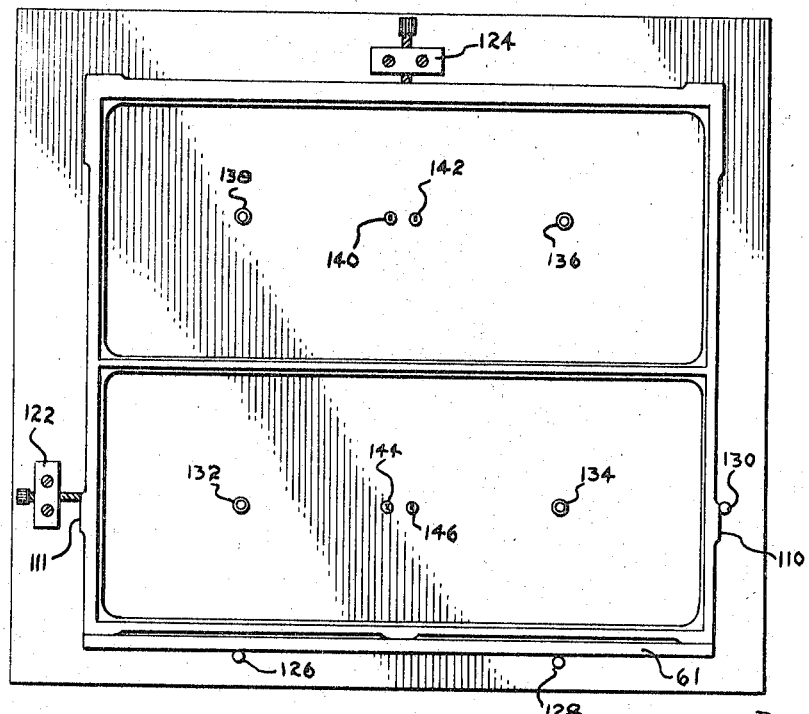
INVENTOR.
BRUCE RICHARD McFADDEN
MICHAEL PLAXA
BY Curtis, Morris & Safford

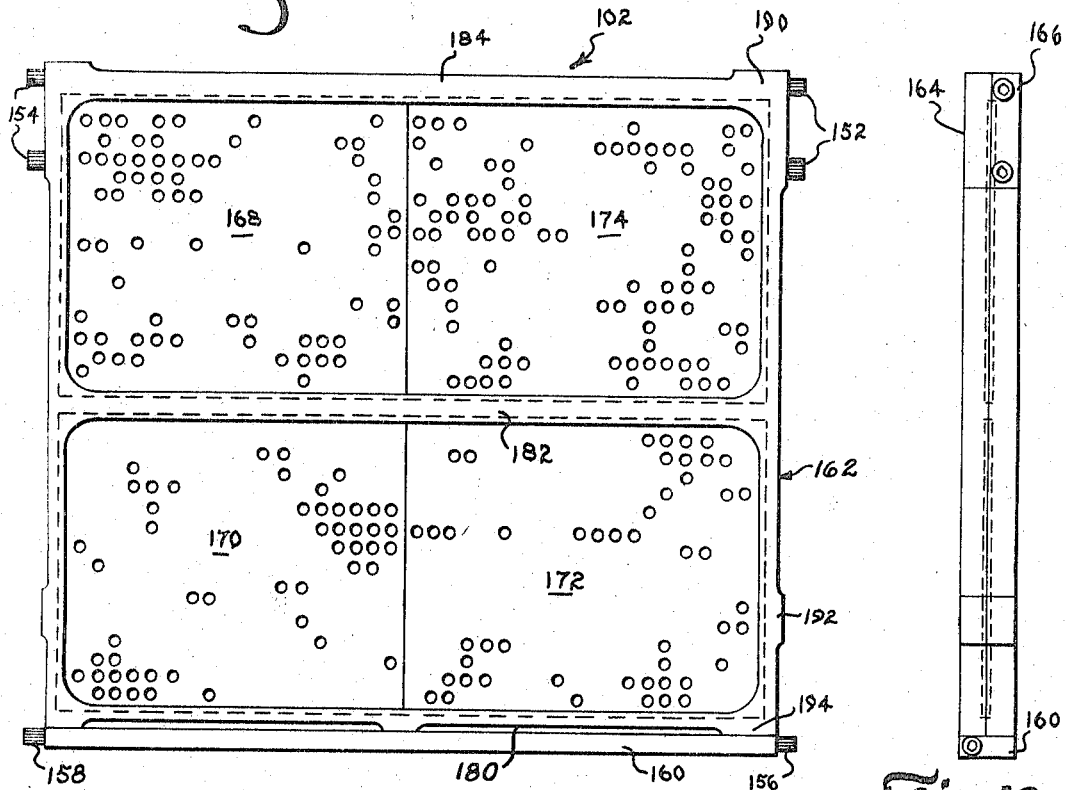
Fig. 11
Fig. 12
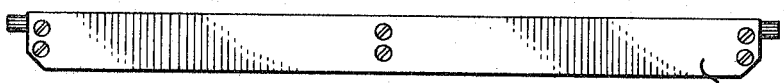
Fig. 13
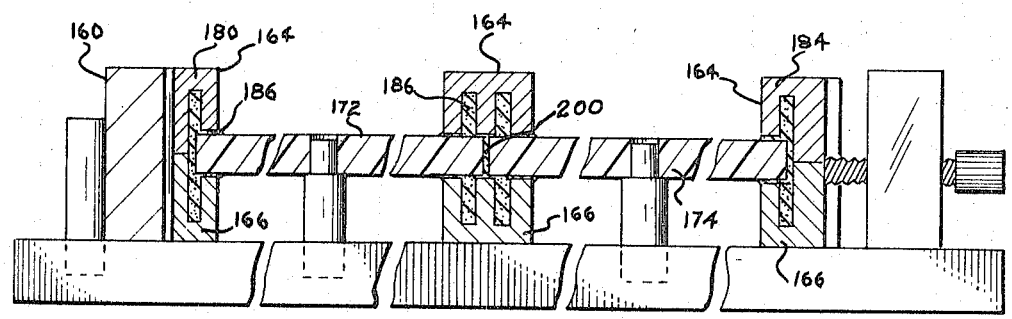
Fig. 17
INVENTOR.
BRUCE RICHARD McFADDEN
MICHAEL PLAXA June 6, 1967  B. R. McFADDEN ET AL  3,324,443
PLUGBOARD DEVICE CONSTRUCTION AND METHOD
Filed March 9, 1964  8 Sheets-Sheet 7

INVENTOR.
BRUCE RICHARD McFADDEN
MICHAEL PLAXA
BY Curtis, Morris & Safford

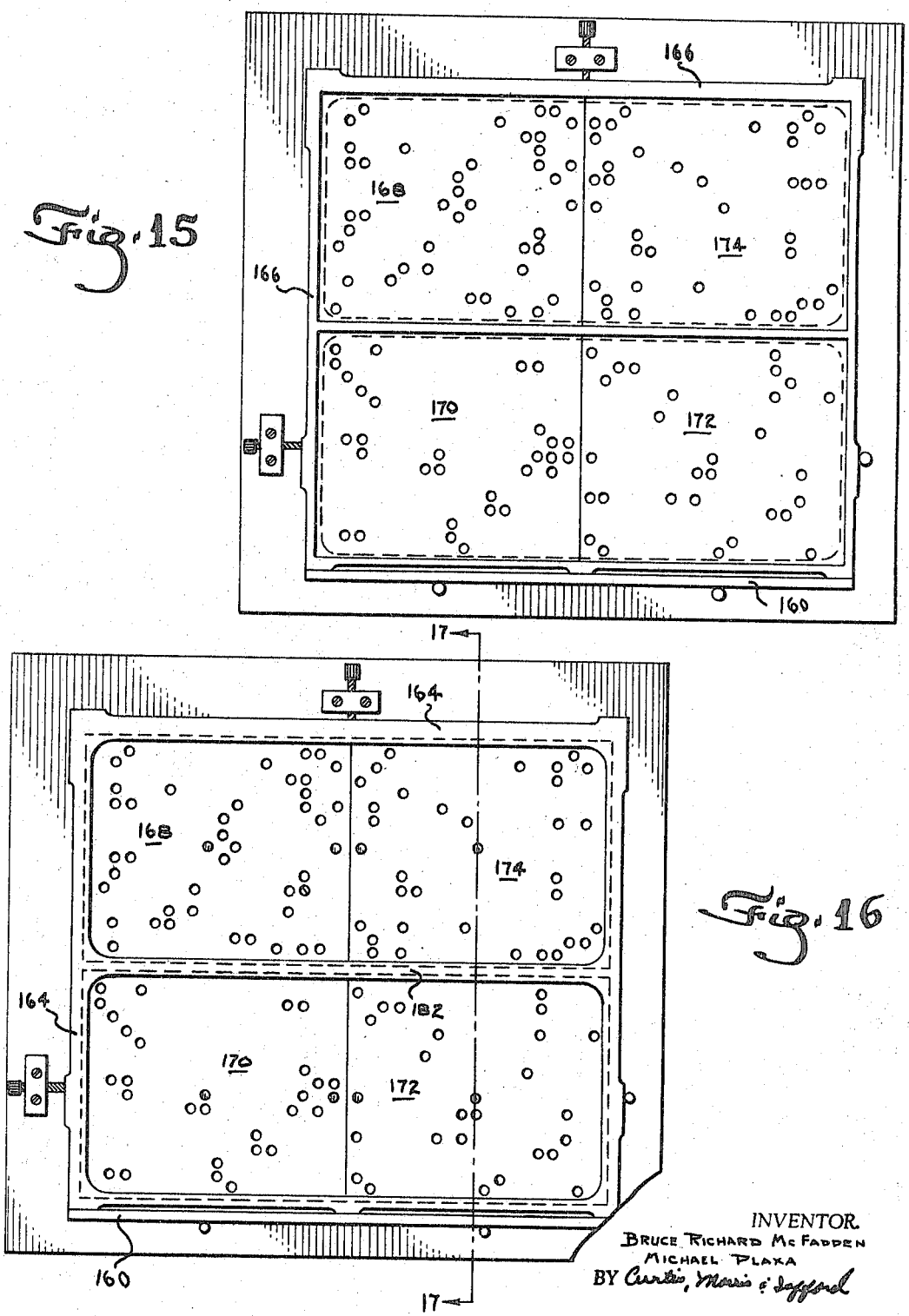

United States Patent Office 3,324,443
Patented June 6, 1967

3,324,443
PLUGBOARD DEVICE CONSTRUCTION
AND METHOD
Bruce R. McFadden, Harrisburg, and Michael Plaxa, Camp Hill, Pa., assignors to AMP Incorporated, Harrisburg, Pa.
Filed Mar. 9, 1964, Ser. No. 350,450
8 Claims. (Cl. 339—18)

This invention relates to plugboard devices, and particularly to an improved panel construction and a method of manufacture for such.

A plugboard device constitutes a type of multiple electric switch which is most frequently used to "program" electrical and/or electronic circuits by effecting closure of selected electrical paths. A typical construction includes as a basic part, a rear bay having a matrix of fixed contact springs permanently interconnected by leads to the various components and subcomponents of a system, which functions to perform different functions dependent upon the pattern or program of interconnections employed. With each rear bay there is provided a front bay or movable panel carrying a number of plug contacts or patchcords arranged in patterns to interconnect with the fixed contacts of the rear bay and thereby interconnect the leads of system components. Frequently, as for example in computer use, each plugboard rear bay is served by several front bays with a distinct program defined by the patchboard arrangement of each front bay. Uses wherein forty or fifty front bays are employed per rear bay are not uncommon. In such cases the plugboard device initially supplied includes a single rear bay and several front bays, with any expansion being accommodated by the addition of front bays as needed over a period of years.

The above factors means that care must be taken in production in order to assure that a given front bay, even even if manufactured completely separate from a given rear bay, will properly fit in a manner so as to assure closure of contact paths. This problem is, of course, present with respect to many manufactured devices wherein multipart structures have replacement parts. The problem is aggravated with plugboard devices due to the large number of individual contact paths which must, without question, adequately close each time the plugboard is operated. This absolute requirement of closure means that the design and construction of the plugboard must be such that in the presence of varying environmental conditions each one of hundreds or thousands of contacts of a front bay must be driven exactly and positioned exactly to engage a corresponding one of hundreds or thousands of rear bay contacts. Specifications demand that this requirement be met after thousands of cycles with closure containing to be made despite wear of parts.

Because of these factors the manufacturer of plugboard devices is exacting and therefore costly, with substantial care required during production and assembly. Even with considerable care in manufacture, problems have been encountered with plugboard devices manufactured in accordance with prior art techniques causing not only failures in contact path closure, but also in certain instances causing excessive contact wear due to slight, but critical, deviations in panel components not practically detectable by quality control.

Accordingly, it is an object of this invention to provide a new plugboard front bay construction and method of manufacture which better assures proper mechanical and electrical operation of plugboard devices.

It is a further object to provide a novel plugboard front bay construction which has fewer components than heretofore required, and includes a structurally integral assembly.

It is another object to provide a novel method of assembly for multi-part structures which substantially reduces manufacturing and assembly tolerance problems.

It is a general object of the invention to provide an improved multiple electrical contact assembly construction and method.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention, but are given for purpose of illustration in order that others skilled in the art may fully understand the invention and the principles thereof and the manner of applying it in practical use so that they may modify it in various forms, each as may be best suited to the conditions of a particular use.

The foregoing objectives are attained by the present invention through a front bay panel construction which includes a metallic frame having insulating board members secured therein by epoxy or similar plastic material. The exterior surfaces of the frame are shaped to minimize machining operations and the interior surfaces are held oversize with assembly dimensions being obtained by employing the securing plastic material as a filler between the board edges and the frame interior. The addition of a stress distributing boot or plate and handles completes the assembly. The invention contemplates both the method of manufacture and the completed product, which is inherently improved in its mechanical and electrical characteristics by reason of the method employed.

In the drawings:

FIGURE 4 is a plan view showing the construction detail of the front bay shown in FIGURE 1;

FIGURE 5 is an elevation of the front bay of FIGURE 4 taken from the right side thereof;

FIGURE 6 is a bottom view of the bay of FIGURE 4;

FIGURE 7 is a plan view of a construction jig utilized in manufacturing the front bay shown in FIGURE 1;

FIGURE 8 is a plan view showing the jig of FIGURE 7 with the frame portion of a front bay in position, FIGURE 8a being a partial enlarged section of a portion of FIGURE 8;

FIGURES 11–13 are views similar to those of FIGURES 8–10, but drawn to an alternative front bay construction;

FIGURE 15 is a plan view showing the addition of panel members to the assembly shown in FIGURE 14;

FIGURE 16 is a plan view of the frame and panel members of the embodiment of FIGURES 11–13 in final position; and FIGURE 17 is a sectional view, enlarged, of the assembly of FIGURE 16.

Figure 1:
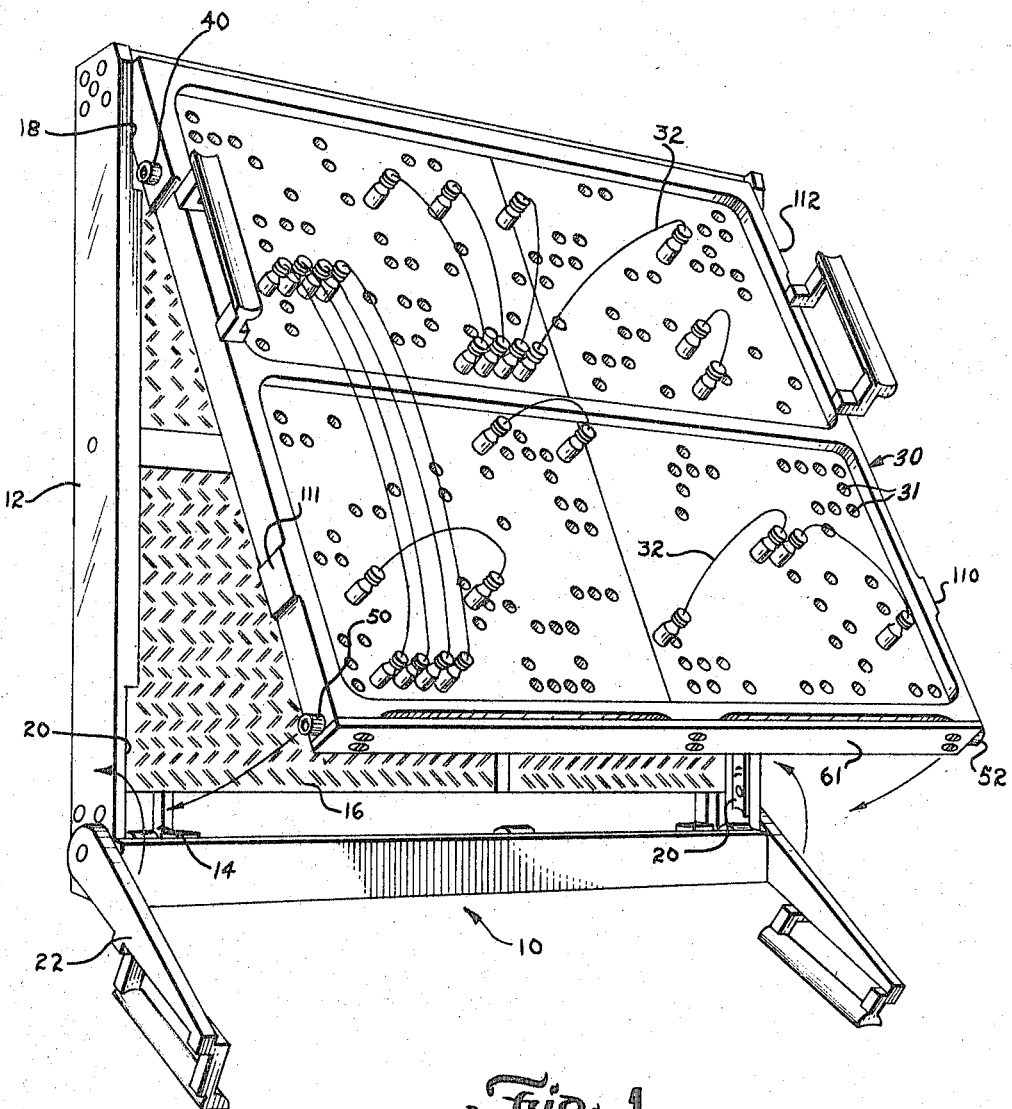
FIGURE 1 is a perspective of a plugboard device including the front bay construction of the invention shown in the open position.

Turning now to a detailed description of the invention, FIGURE 1 shows a preferred embodiment of a plugboard device assembly 10 including a rear bay 12, its camming mechanism 14, rear bay contact springs 16 and a front bay 30. In use, the rear bay 12 is affixed in a convenient position usually near the system it is to serve, with the springs 16 set as shown to balance closure forces and terminated from the rear side by leads connected to system components. At the top on either side of 12 are slots 18 which lead to bearing journals adapted to receive and support upper pin members such as 40 for pivotal movement of front bay 30. At the bottom on either side of 12 are latch members 20, adapted to receive and latch the front bay in position for operation by engagement with a lower pin member such as 50 affixed to 30.

Figure 3:
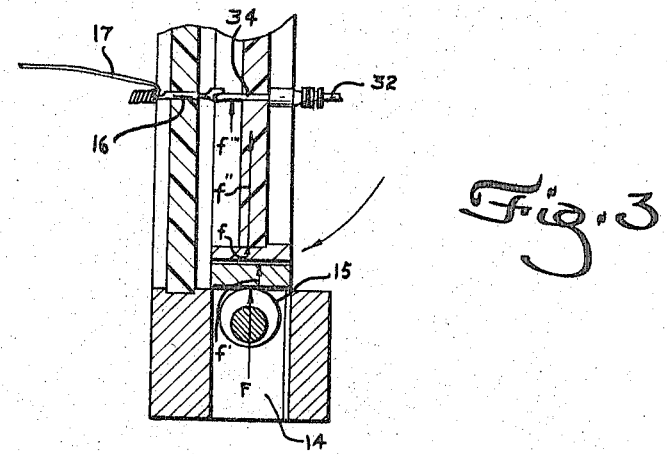
FIGURE 3 is a partial elevation in section, showing the plugboard camming operation applied to the stress plate of the front bay of the invention.

Plugged into the front bay 30 in apertures 31 are patchcords 32, which have contact pins 34 protruding therethrough to engage rear bay contacts upon closure of the front bay therein. This is shown in FIGURE 3, wherein a patchcord pin 34 extends to contact a rear bay contact spring 16 and thereby a lead 17. The other end of 32, of course, extends to another patchcord pin, rear bay spring and lead to thereby interconnect the leads through the plugboard circuits. The connection thus formed may serve to actuate a wide variety of equipments, as for example to supply power to an amplifier or route input signals to a logic module.

Figure 2:
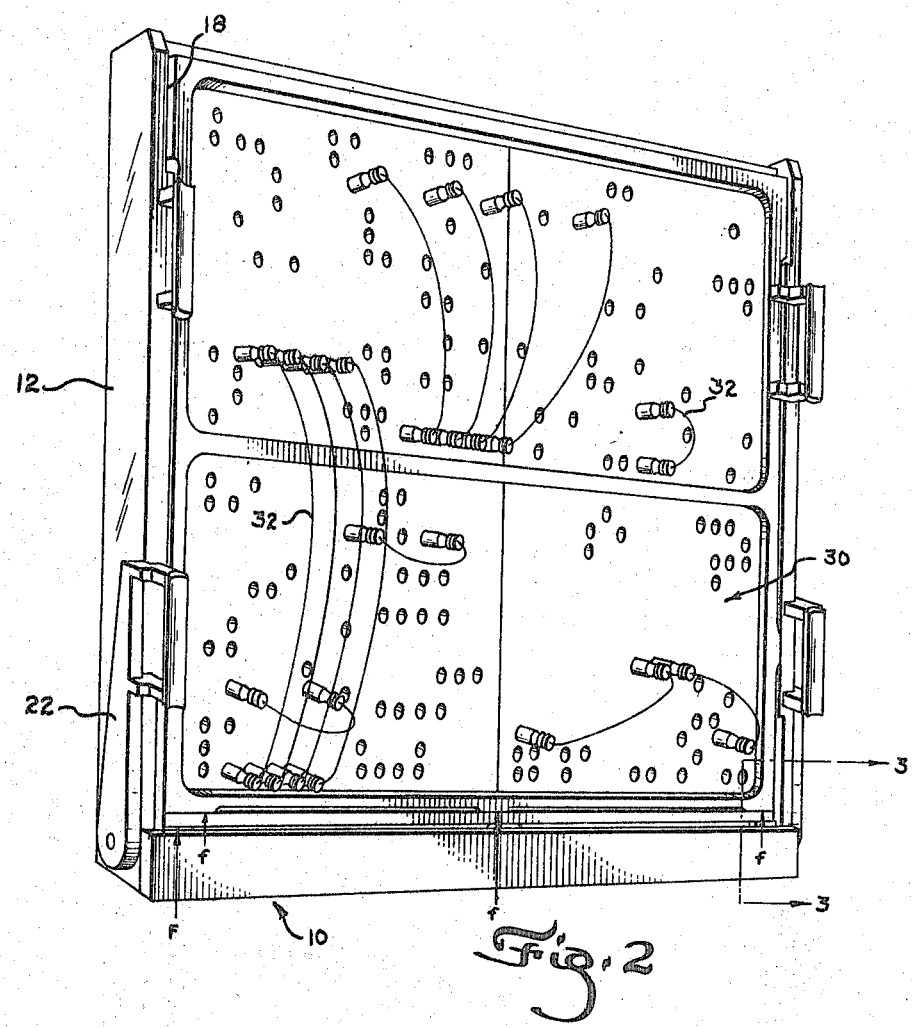
FIGURE 2 is a view of the device of FIGURE 1, with the front bay in the closed position.

FIGURE 2, of which FIGURE 3 is a section, depicts the plugboard as closed, which operation is accomplished by moving the handle members 22 from the position of FIGURE 1 to that shown. With this operation cam members 24, part of mechanism 14, are rotated to drive the front bay upwardly, so that pins 34 engage and deflect springs 16 under pressure. In a typical system the final pressure or force per spring is from 6 to 8 ounces of force to assure good contact even in the presence of vibration or inertial loads, and to assure a wiping action between contact surfaces sufficient to clean dust or other contamination and provide a low resistance path therebetween.

The force relationships which are developed by the cumulative forces of the spring-pin pairs relative to the camming mechanism and the front bay are important to a complete understanding of the structural aspects of the invention. From FIGURE 1 it can be seen that the camming mechanism 14 operates to drive cams such as 15, shown in FIGURE 3, to apply a vertical force F to the bottom of front bay 30, which force is then transferred through the structure of the rear bay as forces $f$, $f'$, $f''$ to each pin 34 to apply a force $f'''$ to each spring 16. Considering for example, that a thousand spring-pin pairs are present, the total F will be on the order of 440 pounds and the pressure in p.s.i. will be the force quantity divided by the area. Since the area between 15 and the bottom of 30 is a line contact the area is relatively small, on the order of an actual unit of thousandths of a square inch, thus yielding a high p.s.i. The forces $f$, $f'$, $f''$ and $f'''$, of course, are directly related to F and each has a pressure related to F and the area of the member bearing that part of the force.

As an additional consideration, the vertical force relationships above described create a cumulative couple which operates to drive bay 30 outwardly, which tendency is resisted by the pin members such as 40–52 on the bay frame sides, top and bottom and thereby through the frame of the front bay.

The foregoing forces generated in the operation of a plugboard device must be carried over long periods of time without creep, compression or relaxation of any of the components. In a typical application the average total vertical pin travel is thousandths of an inch to obtain the desired 6 to 8 ounces of force. A relaxation due to compressional creep of thousandths of an inch would most assuredly cause a substantial percentage of spring-pin pairs to actually open circuit with others having their contact force so reduced as to increase the resistance beyond any acceptable value.

With these factors in mind, the construction of the invention will now be described relative to the embodiment of FIGURES 4–6. The front bay 30 includes a frame 60 of a metallic construction such as aluminum alloy formed by casting techniques or formed of extrusions fitted together. The particular construction shown is of a size to accommodate upper and lower separated insulating panels such as the four shown as 72, 74, 76 and 78, it being understood that the size may be made smaller or larger as desired. For example, the features of the invention may be incorporated in a front bay having two or six panels rather than the four shown, in either case incorporating the general construction of FIGURE 4. Each of the panels is comprised of a molded insulating material such as phenolic resin or diallyl phthalate apertured as at 80 to receive patchcord pins in the manner shown in FIGURES 1–3. The apertures 80, of course, extend over the face of the board in a symmetrical pattern.

The frame 60 includes a top piece 81, a bottom piece 82, and in the embodiment of FIGURE 4, a center piece or sill 84, joined at the ends thereof to side pieces 86 and 88. As a further part of bay 30 is a stress plate 61 which serves to receive and distribute the forces F heretofore described. For this reason plate 61 is made of stainless steel or a similar material sufficiently thick to resist bending under any unbalance of load caused by a patchcord distribution on only one side of bay 30, which at times may occur.

Figure 10:
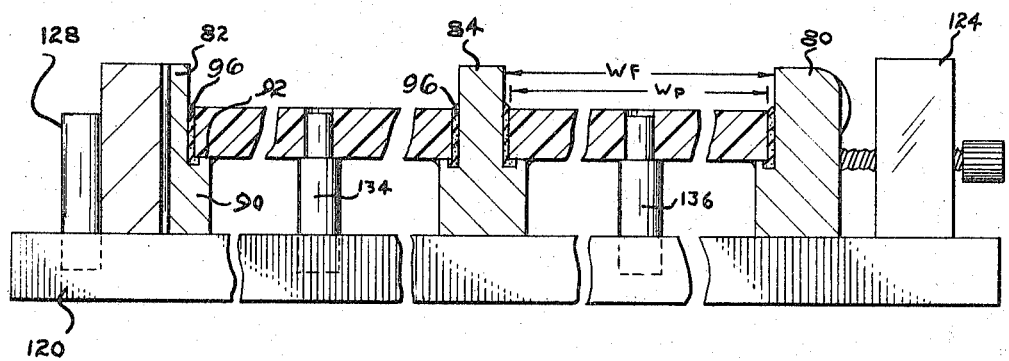
FIGURE 10 is a fragmentary section of the assembly of FIGURE 9 showing the penultimate step of the method of the invention in greater detail.

The various pieces which make up frame 60 have cross-sectional configurations as best indicated in FIGURE 10, the side pieces 86 and 88 being similar to that of the bottom piece 82. Each piece includes an offset such as 90 shown with respect to piece 82 in FIGURE 5, which includes an upper surface 92 against which the insulating panels are secured. Around surface 92 there is provided a recess 94, the function of which will be described hereinafter.

As can be seen from the inner outline of the frame in FIGURE 4, the offset of each frame piece serves to form a horizontal bearing surface which surrounds the panels 72–78. A vertical bearing surface is also formed as indicated by the outer dotted line in FIGURE 4. Between the horizontal and vertical surfaces of the frame pieces is provided a thermosetting plastic material, such as epoxy resin shown generally as 96. FIGURE 8a and in FIGURE 10 it is preferred, although not absolutely required, that the plastic material extend fully around each set of panels 74–76 and 72–78. It should at least extend along a substantial portion of each panel edge in order to provide a sufficient area to accommodate the forces F and particularly $f$, above described, as well as any forces acting upon the sides of the frame.

From FIGURES 4 and 5 it will be apparent that the panels 72, 74, 76 and 78 are held against any outward movement by the surfaces of the frame offset. If epoxy cement is used as the plastic material, it will serve to hold the panels against any movement in the opposite direction relative to frame 60.

The use of a plastic cement such as epoxy substantially surrounding the insulating panel members has been found to provide a sufficient bonding of the frame pieces and the panels so that for all practical purposes the front bay is an integral structure, even though the panels and frame are of dissimilar materials. This has been found to enhance bay characteristics by preventing any tendency of the components to float and thereby cause circuit failures, a fault sometimes present in prior art constructions which permit the frame and panel members to move relative to each other. By having the panels positively bonded to the frame the dimensional integrity of the bay is held whether the bay is lightly or heavily loaded with patchboards.

The exterior surfaces of the front bay frame 60 include a number of features adapted to assure proper operation of the plugboard device by providing a constancy of dimension from bay to bay. With respect to the bottom frame piece 82, three spaced surfaces 100, 102 and 104 are provided contacting the upper surface of stress plate 61, with piece 82 being relieved as at 108 therebetween. Vertical loads F arising by reason of the camming operation are then transmitted to the frame-panel assembly solely via 100, 102 and 104. This means that the forces F are concentrated rather exactly with respect to each of the different front bays rather than being distributed unevenly, as is the case in prior art constructions. The surface areas 100, 102, and 104 are made sufficient such that the particular material used for frame 60 can adequately withstand the maximum pressure which might arise. The interior surface of 82 is however made to contact the panels 74 and 76 over the maximum area of the board edge through the use of the plastic filler 96 to thus lower the pressure applied to the non-metallic panels from the metallic frame piece.

The side pieces 86 and 88 of frame 60 also include surface areas of contact with the rear bay frame, such being shown as 110 and 112 relative to 86. As with the bottom piece but to a lesser extent due to lower forces, this operates to more exactly fix the bearing surfaces from front bay to front bay. The top frame piece 80 includes raised portions at opposite ends such as 114 to provide additional metallic material for support of pins 44 and 46 which bear the weight of the front bay and the impact forces as a front bay is first placed within a rear bay.

The construction just described is useful with different types of materials and in a sense facilitates a wider use of materials of different types by reason of a thermosetting plastic which is compatible with both other thermosetting materials and metals. Moreover, by virtue of the use of the plastic filler, the tolerance deviations expected with different types of materials can better be accommodated. For example, the frame construction can be a single piece casting of aluminum alloy or can be of aluminum extrusions pieced together at the ends thereof. Any slack or space due to deviations from production forming can be taken up by the plastic filler. In actual units constructed in accordance with the invention the frame 60 was comprised of an aluminum alloy single piece casting approximately 18.3 x 25.5 inches overall. The frame was 1.3 inches in depth with a thickness varying from 0.69 inch for the top to 0.34 inch for the bottom, 0.49 inch for the sides and 0.63 for the center piece, all maximum dimensions and approximate. The offset was about 0.13 inch; the portions 100, 102, 104, 110 and 111 were about 1 square inch in area. The frame and panels were dimensioned in width and breadth to leave a space therebetween of about 0.030 of an inch. The filler employed was commercial epoxy identified as Resin A9-4297, Catalyst H2-3404, Hysol Corporation, Olean, N.Y. The panels were of molded phenolic resin and were secured in the frame only by the epoxy. The front bay so constructed was found to be intact and "in tolerance" after many cycles of use and extensive shock tests.

Turning now to the method of the invention, FIGURE 7 shows one example of a jig fixture found useful in production procedures. The jig is comprised of a heavy steel base plate 120 having secured therein a series of adjustable tolerance stations such as 122 and 124 exactly spaced from fixed tolerance pins 126, 128 and 130 positioned to engage the exterior surfaces of a front bay frame. Additionally, a number of further fixed tolerance pins 132, 134, 136 and 138 are exactly secured to the jig plate at the center points of each insulating panel, with four further fixed pins 140, 142, 144 and 146 spaced relative thereto to engage insulating panel apertures near the panel edge. The exterior pins 126-130 have a configuration to provide a line contact with the exterior surfaces of a frame member and the pin 132-144 have an upper portion of a diameter to fit within the apertures of panel members, as better shown in FIGURE 10.

The adjustable tolerance stations 122, 124 are provided either with number markings or stops to lock movement to an amount "in tolerance" and the pins are made as close to the exact center of tolerance as possible.

Figure 9:
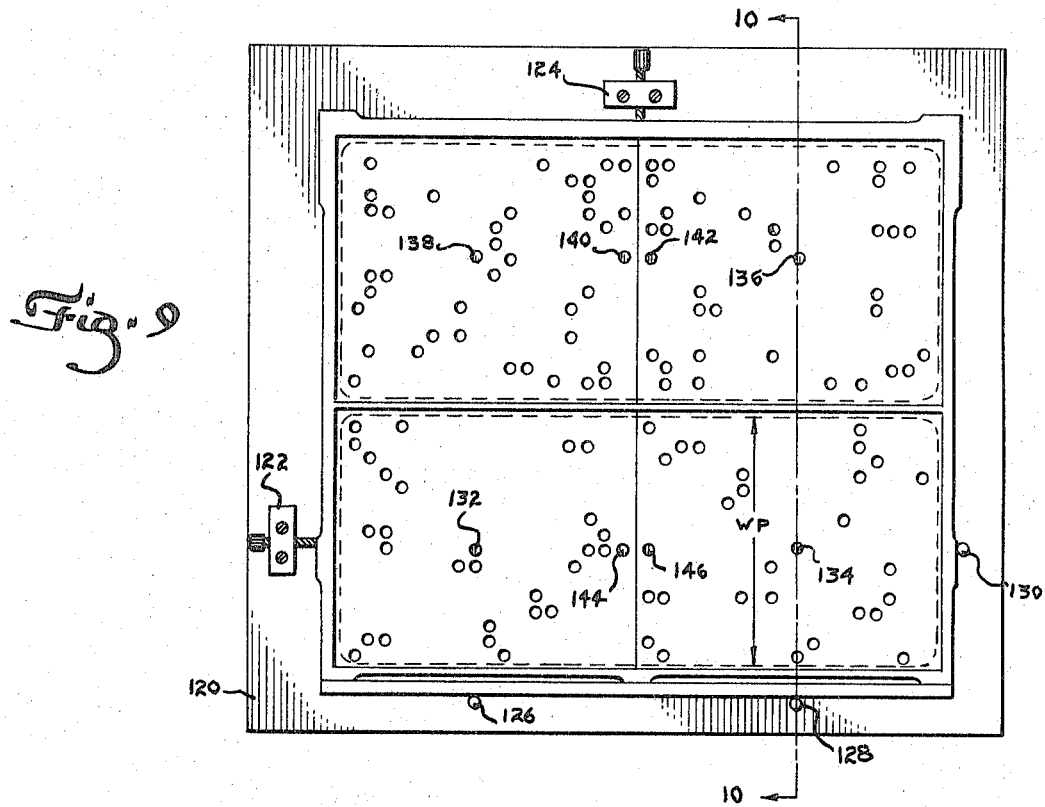
FIGURE 9 is a plan view showing the jig of FIGURE 7 with the frame and boards of a front bay in position.

In practice, after frame 60 has been assembled to the extent shown in FIGURE 8, the frame assembly is placed face down on jig 120 with the stations 122 and 124 adjusted to lock the frame against pins 126, 128 and 130. The frame is then positioned relative to the pins 132-146. As the next step a bead of thermosetting material 96, such as epoxy, is placed around the inside surfaces of the frame as indicated in FIGURE 8A. Next, the panels 72, 74, 76 and 78 are placed as indicated in FIGURES 9 and 10 with apertures thereof positioned to receive pins 132-146 and the panel lower surfaces against the offset surfaces of the frame pieces such as surface 92 of piece 82. The dimensions of each panel relative to the corresponding dimensions of the frame are made such that the maximum widths $W_P$ of each panel including the maximum "over" tolerance deviation are less than the minimum width $W_F$ of the frame including the maximum "under" tolerance deviation. This means that a space between the frame vertical surface and the panel edges will exist under all circumstances, such space being filled by the thermosetting material 96 which flows to fill such space as indicated in FIGURE 10.

In a sense then, the panels 72-78 and frame 60 are separately fixed by jig 120 and the stations and pins therefof with the relative position of panels and their apertures being controlled by the plastic material in filling the spaces therebetween to "float" the panels into proper position with production variations being accommodated thereby. With the front bay assembled as in FIGURES 9 and 10, clamps may be applied to lock the panels against movement relative to the frame and the assembly removed from the jig. After the plastic material has set, the clamps may be removed with the front bay being left flat until the plastic material has cured. The setting and curing times vary with temperature, typical commercial epoxy setting in about 15 minutes and curing in about 2 hours at 65° F.

After the assembly has cured, handles may be added as indicated in FIGURE 1, with the assembly then being ready for use.

Figure 14A:
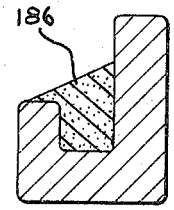
FIGURE 14a is an enlarged partial section of the frame of FIGURE 14.
Figure 14:
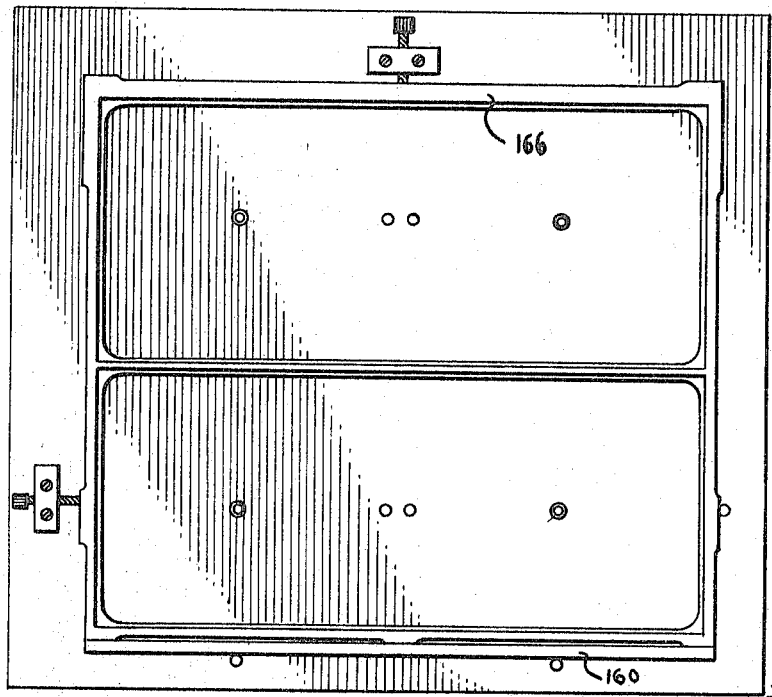
FIGURE 14 is a plan view of a portion of the frame of the embodiment of FIGURES 8–10, positioned in an assembly jig.

FIGURES 11-18 show an alternative embodiment of the invention which has a use identical to the front bay 30 above described. Referring now to FIGURES 11-13, it will be apparent that the rear bay shown as 150 is of a configuration and includes general features to operate as bay 30 above described. The assembly 150 includes pin members 152, 154, at the top thereof and pin members 156, 158 at the bottom thereof to support the bay with a rear bay as shown in FIGURES 1 and 2. A stress plate 160 is provided at the bottom of the bay frame also as above described. The frame itself shown as 162 includes an external configuration similar to frame 60. The interior surfaces differ as indicated in FIGURES 12 and 14. The frame is comprised of two halves 164 and 166 which are fastened together by means of screws (not shown) and/or thermosetting plastic material to captivate insulating panels shown as 168, 170, 172 and 174, and integrally joined thereto. Frame halves 164 and 166 are identical in that they may be matched upon reversal of faces to surround the panels as indicated in FIGURE 14. It is preferred that the side and top pieces of each frame half be relieved in the manner shown with respect to bottom, center and top pieces 180, 182 and 184, respectively, with the recess formed thereby being filled with thermosetting material such as 186. The corner portions of each frame and the side pieces raised portions such as 190, 192 and 194 are preferably of solid material to better receive the stresses applied thereto and to receive screws which either hold the frame together or hold the pins 152, 154 and stress plate 160 thereon.

As in the embodiment above described, the panels have dimensions which leave at their edges a space between the frame surfaces and the panel surface for thermosetting plastic material. Additionally, the center piece of each frame such as 182 is such that the panels rest in an abuting relationship joined by plastic material as at 200 in FIGURE 17. This causes the load forces $f$ to be transmitted to the upper panels directly instead of through the frame center piece. This permits an even broader tolerance deviation of panels and frame to be used, since the space filled with the thermosetting material is larger in the vertical sense.

The method of assembly of the embodiment of FIGURES 11–13 is similar to that above described and may utilize a jig assembly identical to 120 shown in FIGURE 7. As a first step the frame half 166 with the stress plate 160 attached is placed in the jig as in FIGURE 14, with thermosetting material 186 being applied as shown in FIGURE 14A to fill up the recess of the frame piece. Thereafter, the panels 168–174 are placed in position within frame half 166 and over the jig pin members as in FIGURE 15. Next, frame half 164, having been loaded with plastic material, is placed on the jig in position on half 166. With the bay assembly as indicated in FIGURE 17, the frame may be clamped and removed, or if screws are used to hold the halves together, such may be applied in lieu of clamps.

The addition of pins 152, 154, 156 and 158 and handles will then complete front bay construction of the embodiment of FIGURES 11–17.

As above mentioned the frame for the assembly of the invention can be of any suitable construction ranging from a one-piece casting to a five (excluding the stress plate) piece assembly of extruded metal pieces fastened at their ends. It is also contemplated that the frame can be of metal stampings or partially cast and partially of extruded or stamped pieces. For example, the outer frame portions, top, bottom and sides may be cast with the center piece of an extrusion or stamping. In certain systems, as for example the plugboard device shown in U.S. Patent No. 2,939,100 to W. S. Watts, the panels may include metallic members for coaxial shielding. The frame of the invention is ideally suited to such use since the plastic filler serves as insulation for cases where the shielding is at an electrical ground other than zero.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration and principles thereof and the manner of applying them in practical use so that they may modify them in various forms, each as may be best suited to the conditions of a particular use.

We claim:

1. An assembly for electrical contactor panels of the type utilized in plugboard devices comprising a number of insulating board members each including a matrix of transverse apertures adapted to secure contactors inserted therein, a frame surrounding and supporting said board members, said frame including means attached thereto to facilitate the insertion of said assembly in a plugboard device so that contactors inserted in the board members are aligned with spring members in the plugboard device for pressure engagement therewith upon operation of the plugboard device, said frame further including a relatively heavy metallic stress plate attached to the bottom thereof to receive and distribute the camming forces developed during operation of said plugboard device, the said frame having extending around the inside thereof transverse surfaces which define a cavity in which the board members are positioned, the width dimension of the cavity of said frame being greater than the same relative width dimension of the board members, the board members being positioned in said frame with respect to the surface defining said width dimension to be free of contact of said frame and to define a space surrounding said board member, the said space being substantially filled with thermosetting plastic material which is placed in said space in a fluid state and cured and set in said space to hold said boards and frame in a structurally integral assembly.

2. In a plugboard assembly of the type utilized to program electrical circuits, a first bay including first panel means apertured to accommodate contact springs disposed therein, a plurality of contact springs secured in said panel means and extending outwardly transverse to the major surface thereof, a second bay including second panel means apertured to accommodate contactor plugs inserted therein, a plurality of contactor plugs secured in said second panel means and extending outwardly therefrom, a receiver means affixed to said first bay to receive said second bay and position said contactors in alignment with said springs, said receiver means including a mechanism to drive said second bay relative to said first bay to cause said contactors to engage and deflect said contact springs under substantial force, said second bay having an outer frame of metallic construction surrounding said second panel, said frame including an interior opening having a first surface parallel to the major plane of said second panel with said first surface being dimensioned to overlie the major surface of said panel along at least three sides thereof, said opening including a second surface transverse to the major plane of said panel, said second surface being dimensioned to be slightly greater than said panel in width and to surround said second panel on at least three sides thereof, the said second panel being fitted within said second bay frame and spaced from the said second surface and a thermosetting cement material filling the space between the said second surface and the said second panel to bond said second panel to said frame, the said thermosetting adhesive material having characteristics to withstand forces resulting from said second bay being driven to cause said plug contactors to engage said contact springs under substantial force.

3. The assembly of claim 2 wherein there is provided between said first and second surfaces a recess accommodating a volume of said thermosetting adhesive material to increase the strength of the bond between said frame and said second panel.

4. The assembly of claim 2 wherein the said opening is dimensioned relative to said panel means to accommodate two separate panels, the said panels being positioned in an abutting relationship along one side thereof with the other three sides thereof being surrounded by said frame and bonded thereto.

5. The assembly of claim 2 wherein said frame includes a plate attached to the exterior thereof and extending along one side thereof, said plate having characteristics to transfer and distribute compressive loads applied to said frame by said receiver means.

6. A patchcord panel assembly adapted to be fitted within a rear bay of a plugboard device to close contact paths between contact springs in said rear bay and contactors fitted in said assembly, said assembly including an outer metallic frame having at least one interior opening therein, said opening being defined by parallel surfaces spaced apart by a given dimension, a panel member adapted to be fitted within said opening, said panel member having parallel edges spaced apart by an amount less than said given dimension and including a series of apertures therein adapted to receive plug contactors to be forced into engagement with contact springs in a rear bay under substantial pressure, the said panel member being bonded to said frame member by a thermosetting cement material engaging outside parallel surfaces of said panel member and inside parallel surfaces of said frame member and bonding said surfaces together to rigidly join said panel member to said said frame member and including characteristics to withstand tensional and compressional loading resulting from handling of said assembly and use of said assembly in the rear bay of a plugboard device.

7. An improved patchboard assembly adapted to be fitted within the rear bay of a plugboard device to close contact paths between contact springs in said rear bay and plug contactors in said panel assembly, said assembly comprising an outer metallic frame having top, bottom and side members rigidly held together to surround and support a panel member apertured to receive plug contactors, the said side members each including portions of a relatively small area projecting outwardly of the main body of the frame side member, the said bottom member including portions each of a relatively small area extending outwardly of the main body of the frame bottom member, the said relatively small areas of the said side members being spaced apart to control the width dimension of said assembly with respect to the rear bay of a plugboard device and the relatively small areas of the bottom members serving to fix the point of loading of said frame in use in said rear bay.

8. The method of manufacturing a contactor assembly comprised of a frame member and at least one insulating panel member having transverse apertures therein, comprising providing an interior opening in said frame member having a general configuration similar to that of the panel member with respect to the major plane thereof and having width dimensions slightly greater than the same relative width dimensions of a panel member, depositing a mixture of substantially uncured thermosetting plastic material in said opening, and placing said panel member in said frame member, positioning said panel member relative to said frame member by means of a jig fixture including a jig pin member placed toward the center thereof with an aperture toward the center of said panel member being placed on said jig pin member and with at least two other jig pin members engaging intersecting portions of said frame member, securing said panel and frame members against relative movement and permitting said plastic material to cure and set.

References Cited
UNITED STATES PATENTS

| | | | |
|---|---|---|---|
| Re. 12,129 | 6/1903 | Pierson | 52—434 X |
| 1,725,808 | 8/1929 | Liese | 52—434 |
| 1,893,101 | 1/1933 | Old | 52—434 X |
| 3,004,369 | 10/1961 | Findlay | 52—416 X |
| 3,088,728 | 5/1963 | Sanborn | 29—203 X |
| 3,129,045 | 4/1964 | Dexter | 339—18 |
| 3,133,775 | 5/1964 | Plaxa | 339—18 |
| 3,176,353 | 4/1965 | Pilliod et al. | 161—44 |
| 3,184,701 | 5/1965 | Ellis | 339—218 X |

MARVIN A. CHAMPION, *Primary Examiner.*

PATRICK A. CLIFFORD, *Examiner.*